United States Patent
Yonezawa et al.

(10) Patent No.: US 8,427,793 B2
(45) Date of Patent: Apr. 23, 2013

(54) SWITCHING POWER SUPPLY, CONTROL CIRCUIT FOR CONTROLLING SWITCHING POWER SUPPLY, CONTROL METHOD OF SWITCHING POWER SUPPLY AND MODULE SUBSTRATE

(75) Inventors: Yu Yonezawa, Kawasaki (JP); Naoyuki Mishima, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 215 days.

(21) Appl. No.: 12/772,527

(22) Filed: May 3, 2010

(65) Prior Publication Data

US 2010/0220416 A1 Sep. 2, 2010

Related U.S. Application Data

(63) Continuation of application No. PCT/JP2007/071646, filed on Nov. 7, 2007.

(51) Int. Cl.
*H01H 9/30* (2006.01)
*H01H 9/56* (2006.01)
*H01H 73/18* (2006.01)

(52) U.S. Cl.
USPC .................. 361/13; 361/18; 361/111

(58) Field of Classification Search ............... 361/2–14, 361/18, 111
See application file for complete search history.

(56) References Cited

U.S. PATENT DOCUMENTS

| | | | | |
|---|---|---|---|---|
| 3,737,724 A | * | 6/1973 | Salge et al. | 361/8 |
| 4,005,340 A | * | 1/1977 | Hartel | 361/3 |
| 4,550,356 A | * | 10/1985 | Takahashi | 361/9 |
| 4,740,858 A | * | 4/1988 | Yamaguchi et al. | 361/4 |
| 6,266,230 B1 | * | 7/2001 | Kato et al. | 361/321.2 |
| 6,483,678 B1 | * | 11/2002 | Morita et al. | 361/2 |
| 6,646,842 B2 | * | 11/2003 | Pan et al. | 361/58 |
| 6,850,401 B2 | * | 2/2005 | Inoue et al. | 361/111 |
| 7,391,133 B1 | * | 6/2008 | Hennessy et al. | 307/113 |
| 7,486,488 B2 | * | 2/2009 | Wakatsuki et al. | 361/11 |
| 2003/0052655 A1 | * | 3/2003 | M. Harris et al. | 323/225 |
| 2006/0175627 A1 | | 8/2006 | Shiraishi | |
| 2006/0231904 A1 | * | 10/2006 | Kocon | 257/391 |
| 2007/0064356 A1 | * | 3/2007 | Wakatsuki et al. | 361/2 |
| 2008/0012610 A1 | * | 1/2008 | Aoki et al. | 327/109 |
| 2009/0072368 A1 | * | 3/2009 | Hu et al. | 257/676 |

FOREIGN PATENT DOCUMENTS

| | | |
|---|---|---|
| JP | 2005-245119 | 9/2005 |
| JP | 2006-173717 | 6/2006 |
| JP | 2006-223016 | 8/2006 |
| WO | 2005/041231 A1 | 5/2005 |

OTHER PUBLICATIONS

International Search Report, PCT/ISA/210, for PCT/JP2007/071646, mailed on Feb. 12, 2008.

* cited by examiner

*Primary Examiner* — Jared Fureman
*Assistant Examiner* — Christopher Clark
(74) *Attorney, Agent, or Firm* — Staas & Halsey LLP

(57) ABSTRACT

A switching power supply includes: a first switch provided between a positive terminal of a DC power supply and a positive terminal of a load; a second switch connected in parallel with the first switch; a first capacitor provided between the second switch and a node of the first switch on a DC power supply side; a first inductor provided between the first capacitor and the positive terminal of the DC power supply; and a control circuit that turns off the second switch after the first switch is turned off and when or before a voltage across the first capacitor becomes zero.

11 Claims, 16 Drawing Sheets

US 8,427,793 B2

SWITCHING POWER SUPPLY, CONTROL CIRCUIT FOR CONTROLLING SWITCHING POWER SUPPLY, CONTROL METHOD OF SWITCHING POWER SUPPLY AND MODULE SUBSTRATE

CROSS-REFERENCE TO RELATED APPLICATION

This application is a continuation application of PCT PCT/JP2007/071646, filed Nov. 7, 2007, the contents of which are herein wholly incorporated by reference.

FIELD

A certain aspect of the present invention is related to a switching power supply, a control circuit for controlling a switching power supply, a control method of switching power supply, and a module substrate.

BACKGROUND

For example, a step-down type of DC-DC converter is used in information equipment. Such a DC-DC converter employs a switching power supply using a switch. FIG. 2 of Patent Document 1 and FIG. 29 of Patent Document 2 disclose a switching power supply configured so that a series circuit of a transient current switch and a capacitor is connected in parallel with a switch, and a resistor is connected in parallel with the capacitor.

According to Patent Documents 1 and 2, a transient current that flows when the switch is turned on/off is stored in the capacitor, and the charge stored in the capacitor is consumed by the resistor.

[Patent Document 1] Japanese Laid-Open Patent Publication No. 2006-173717
[Patent Document 2] International Publication Pamphlet No. 2005/041231

SUMMARY

According to an aspect of the present invention, there is provided a switching power supply including: a first switch provided between a positive terminal of a DC power supply and a positive terminal of a load; a second switch connected in parallel with the first switch; a first capacitor provided between the second switch and a node of the first switch on a DC power supply side; a first inductor provided between the first capacitor and the positive terminal of the DC power supply; and a control circuit that turns off the second switch after the first switch is turned off and when or before a voltage across the first capacitor becomes zero.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will now be given of embodiments of the present invention with reference to the accompanying drawings.

Embodiment 1

Figure 1:
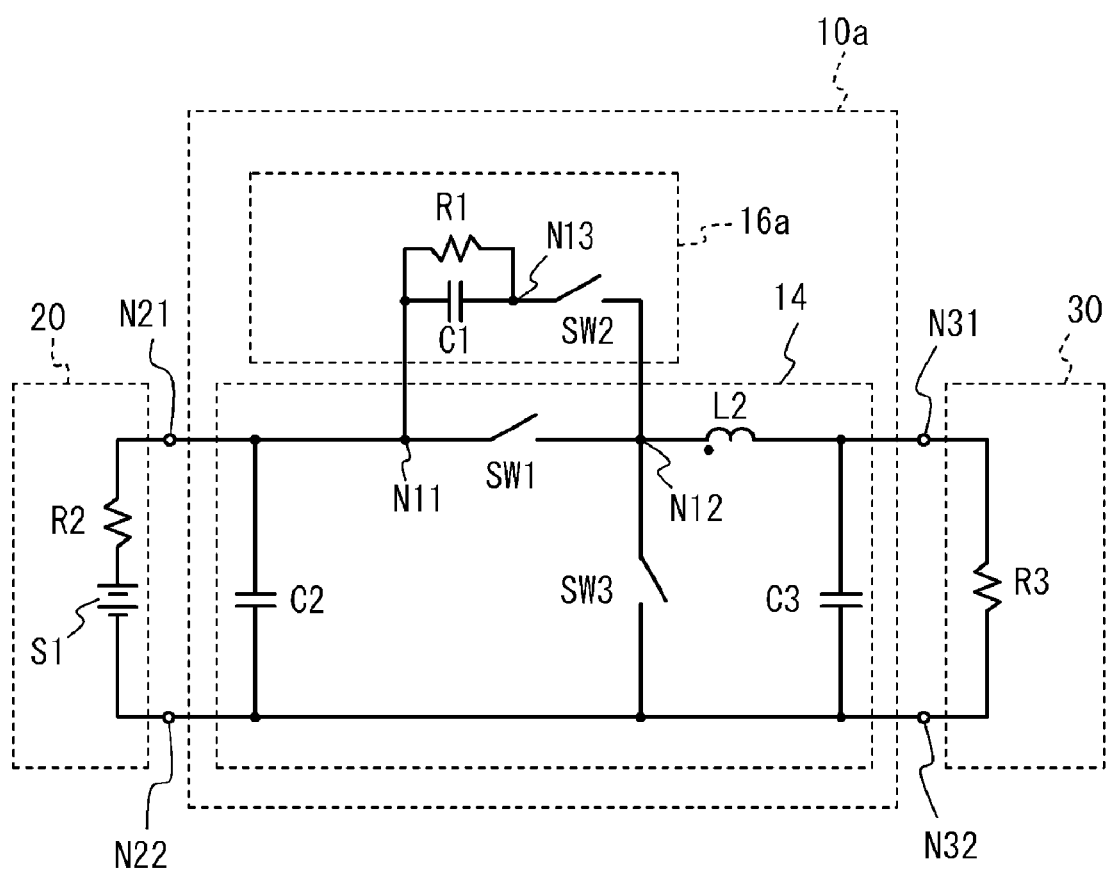
FIG. 1 is a circuit diagram of a switching power supply in accordance with a comparative example.

A description will now be given of a comparative example that is compared with an embodiment 1. FIG. 1 is a circuit diagram of a step-down switching power supply of buck type in accordance with a comparative example. Referring to FIG. 1, a DC power supply 20 and a load 30 are connected to a switching power supply 10a. The DC power supply 20 is made up of a power source S1 and an internal resistance R2. The load 30 is formed by a resistor R3 in the equivalent circuit.

The switching power supply 10a is made up of a step-down power supply part 14 and a transient current suppressing part 16a. The step-down power supply part 14 is connected to a positive terminal of the DC power supply 20 via a terminal N21, and is connected to a negative terminal of the DC power supply 20 via a terminal N22. The DC power supply 20 is connected to a positive terminal of the load 30 via a terminal N31, and is connected to a negative terminal of the load 30 via a terminal N32. A second capacitor C2 is connected between the terminals N21 and N22 for the DC power supply 20, and a third capacitor C3 is connected between the terminals N31 and N32 for the load. A first switch SW1 and an inductor L2 are connected between the terminals N21 and N31. A node of the first switch SW1 on the DC power supply 20 side is N11, and another node thereof on the load 30 side is N12. A third switch SW3 is connected between the node N12 and the nodes N22 and N32.

When the first switch SW1 is turned on, current that flows from the DC power supply 20 to the load 30 through the inductor L2 increases. When the first switch SW1 is turned off, current that flows through the inductor L2 decreases. The first switch SW1 is controlled so that the charge stored in the third capacitor C3 is kept constant, that is, the voltage between the terminals 31 and N32 for the load 30 is kept constant. The voltage between the terminals N31 and N32 is thus maintained at a voltage lower than the voltage of the DC power supply 20.

In the transient current suppressing part 16a, a series circuit of a second switch SW2 and a first capacitor C1 is connected in parallel with the first switch SW1 between the nodes N11 and N12. The second switch SW2 is thus provided in parallel with the first switch SW1. The first capacitor C1 is connected between the second switch SW2 and the node N11. A node N13 is between the second switch SW2 and the first capacitor C1. The resistor R1 is connected in parallel with the first capacitor C1 between the nodes N13 and N11. The second switch SW2 is turned on when the first switch SW1 switches over. The charge developed by the transient current is charged in the first capacitor C1. The charge thus stored is consumed by the resistor R1.

In the switching power supply of the comparative example, the voltage of the DC power supply 20 is stepped down in the step-down power supply part 14, and the transient current caused by switching is suppressed in the transient current suppressing part 16a.

Figure 2:
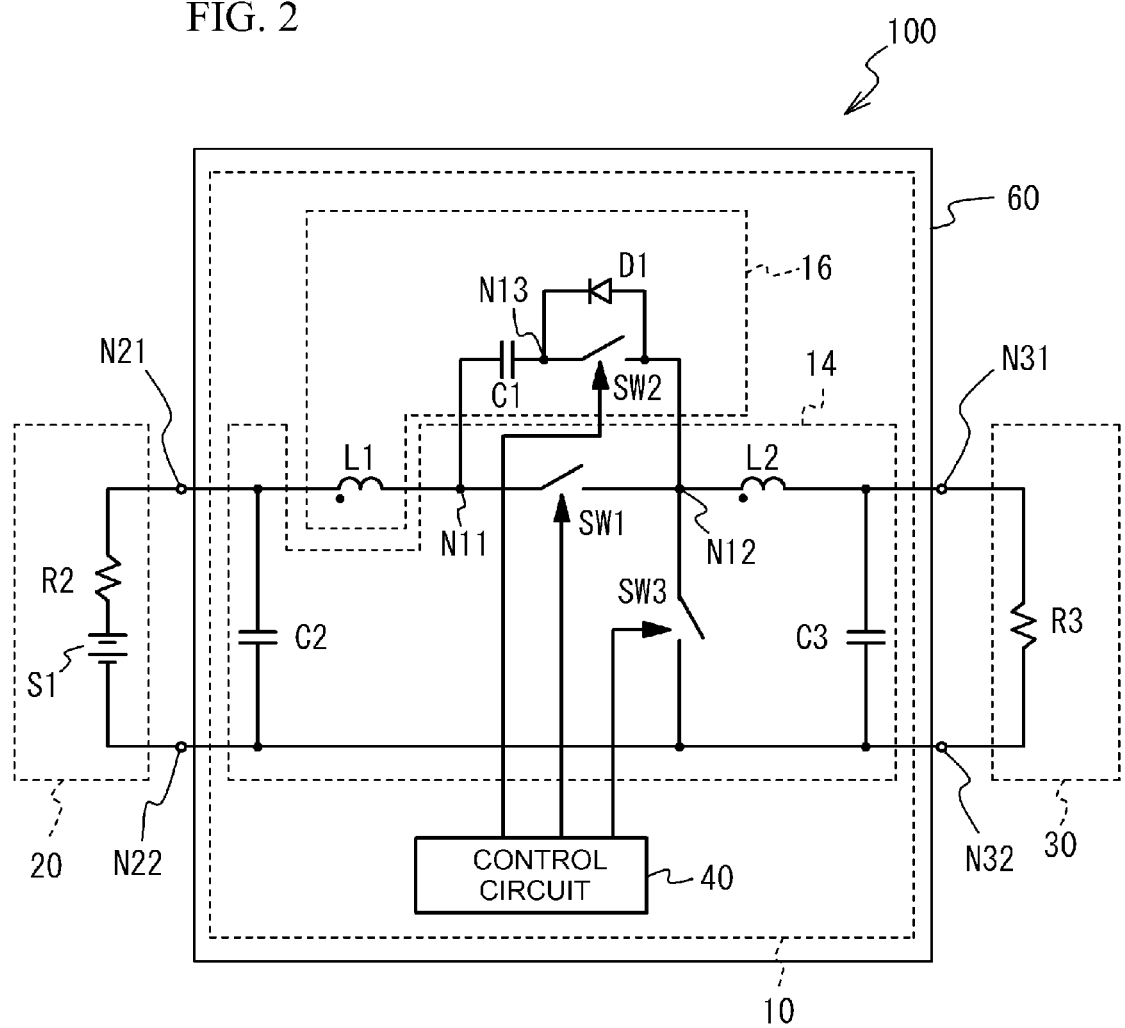
FIG. 2 is a circuit diagram of a switching power supply in accordance with an embodiment 1.

Next, the embodiment 1 is described. FIG. 2 is a circuit diagram of a step-down switching power supply 10 of buck type in accordance with the embodiment 1. Referring to FIG. 2, a switching power supply 10 has a step-down power supply part 14, an transient current suppressing part 16, and a control circuit 40. The step-down power supply part 14, the DC power supply 20 and the load 30 are the same as those of the comparative example, and a description thereof is thus omitted.

In the transient current suppressing part 16, a diode D1 is connected in parallel with the second switch SW2 between the nodes N13 and N12. The diode D1 is connected so that the cathode is located on the DC power supply 20 side, and the node is located on the load 30 side. No resistor is connected in parallel with the first capacitor C1. A first inductor L1 is connected between the nodes N11 and N21. That is, the first inductor L1 is connected between the first capacitor C1 and the terminal N21.

The control circuit 40 is a circuit that controls the on/off switching of the first switch SW1, the second switch SW2 and the third switch SW3.

Figure 3:
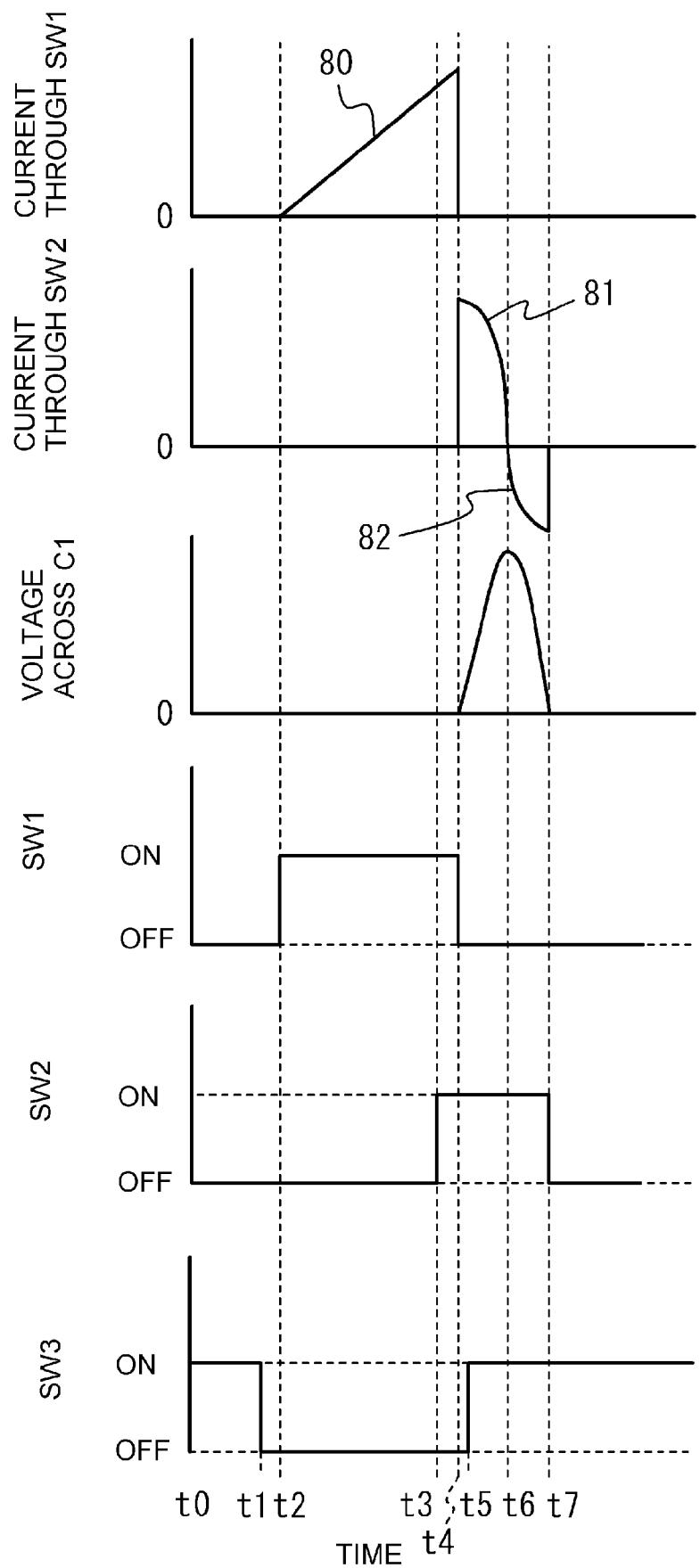
FIG. 3 is a diagram that illustrates an operation of the embodiment 1.
Figure 4:
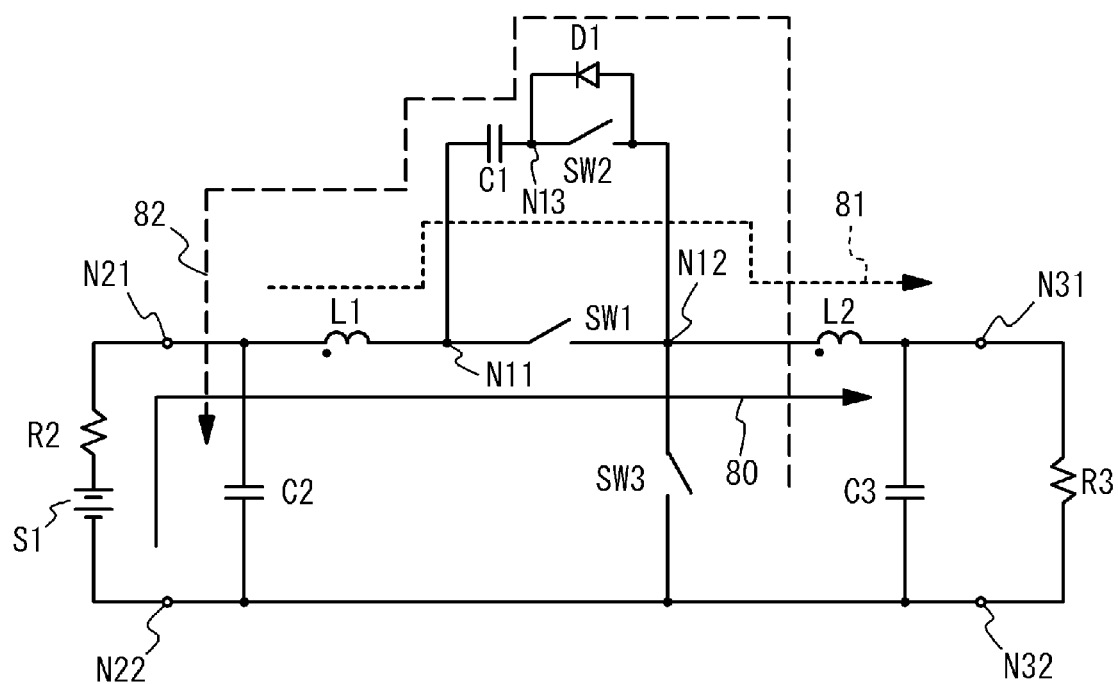
FIG. 4 is a circuit diagram that illustrates the operation of the embodiment 1.

The operation of the step-down power supply part 14 is the same as that in the comparative example, and a description thereof is thus omitted. The operation of the transient current suppressing part 16 is now described. FIG. 3 is a schematic diagram that illustrates the current that flows through the first switch SW1, the current that flows through the second switch SW2, the voltage across the first capacitor C1, and the operation timings of the switches SW1, SW2 and SW3. The current that flows from the DC power supply 20 side to the load 30 side is defined as a positive current. FIG. 4 is a diagram that illustrates flows of currents at steps on the circuit diagram of FIG. 2. Referring to FIG. 3, at time t0, the first switch SW1 and the second switch SW2 are in the off position, and the third switch SW3 is in the on position. During a period from time t0 to time t1, the node N12 is at a voltage almost equal to the voltage of the negative terminal N22, and the current that flows through the second inductor L2 decreases. During the period from time t0 to time t1, the third capacitor C3 shifts to the discharged state from the charged state.

At time t1, the third switch SW3 is turned off. At time T2, the first switch SW1 is turned on. During a period when the first switch SW1 is in the on position (a period from time t2 to time t4), as indicated by an arrow of a solid line in FIG. 4, current 80 flows from the DC power supply 20 to the load 30. As illustrated in FIG. 3, the current 80 that flows through the first switch SW1 increases gradually due to the inductors L1 and L2. During the period from time t2 to time t4, the third capacitor C3 shifts to the charged state from the discharged state. At an arbitrary time t3 in this period, the second switch SW2 is turned on. During a period from time t3 to time t4, the second switch SW2 is in the on position, and the first switch SW1 is in the on position. Thus, as illustrated in FIG. 4, the current 80 mainly flows through the first switch SW1.

When the first switch SW1 is turned off at time t4 in FIG. 3, as indicated by an arrow of a dotted line in FIG. 4, current 81 passes through the second switch SW2 and flows from the DC power supply 20 to the load 30. During a period from time t4 to time t6, the current 81 decreases gradually, and the first capacitor C1 is charged, so that the voltage across the first capacitor C1 rises. At an arbitrary time t5 between the period from time t4 to time t6, the third switch SW3 is turned on. At time t6, the current 81 that flows through the second switch SW2 becomes zero. During a period from time t6 to time t7, due to the resonance of the first capacitor C1 and the first inductor L1, as current 82 indicated by an arrow of a broken line in FIG. 4, current flows from the negative terminal N22 of the DC power supply 20 to the second capacitor C2 via the third switch SW3 and the second switch SW2, and the charge stored in the first capacitor C1 is stored in the second capacitor C2. When the voltage across the first capacitor C1 becomes zero at time t7, that is, when the charge stored in the first capacitor C1 becomes zero, the second switch SW2 is turned off, and the current that flows through the second switch SW2 becomes zero.

A description will now be given of results of simulating the comparative example and the embodiment 1. In the switching power supplies of the comparative example and the embodiment 1 in the simulation, the first switch SW1, the second switch SW2 and the third switch SW3 illustrated in FIGS. 1 and 2 were formed by n-type MOSFETs. The n-type MOSFETs had an on-state resistance of 5 mΩ and a characteristic of IRF3711. The MOSFET used for the second switch SW2 substantially incorporates the diode D1 in FIG. 2. The first capacitor C1, the second capacitor C2 and the third capacitor C3 had capacitance values of 330 nF, 560 µF and 560 µF, respectively, and the second inductor L2 had an inductance value of 70 nH. The DC power supply 20 was the power source S1 of 5 V, and the internal resistance had a resistance value of 10 mΩ. The resistor R2 in the load 30 had a resistance value of 100 mΩ. In the comparative example, the resistor R1 had a resistance value of 500 mΩ. In the embodiment 1, the first inductor L1 had an inductance value of 30 nH.

Figure 5:
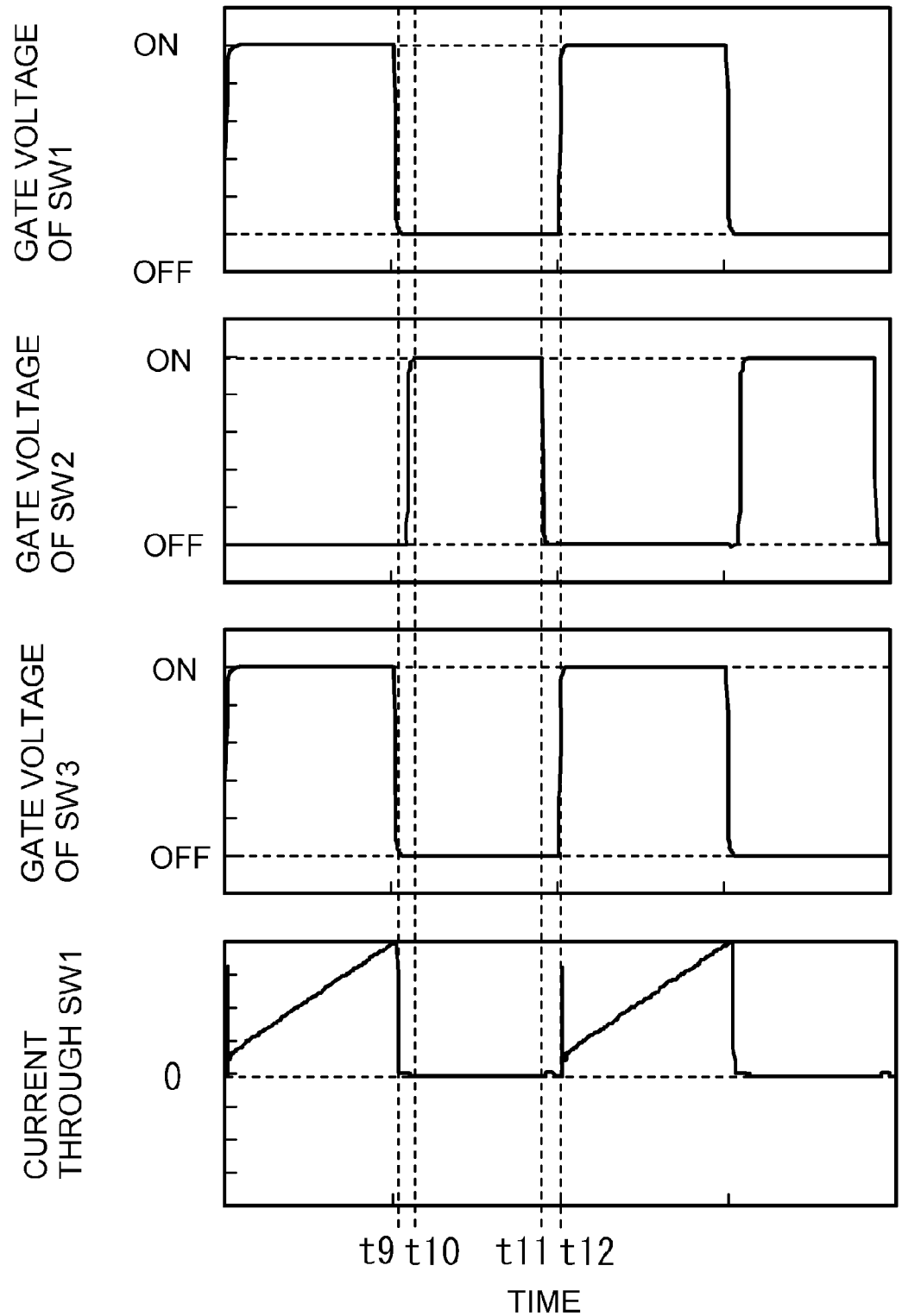
FIG. 5 is a diagram (part 1) that illustrates a simulation result of the comparative example.
Figure 6:
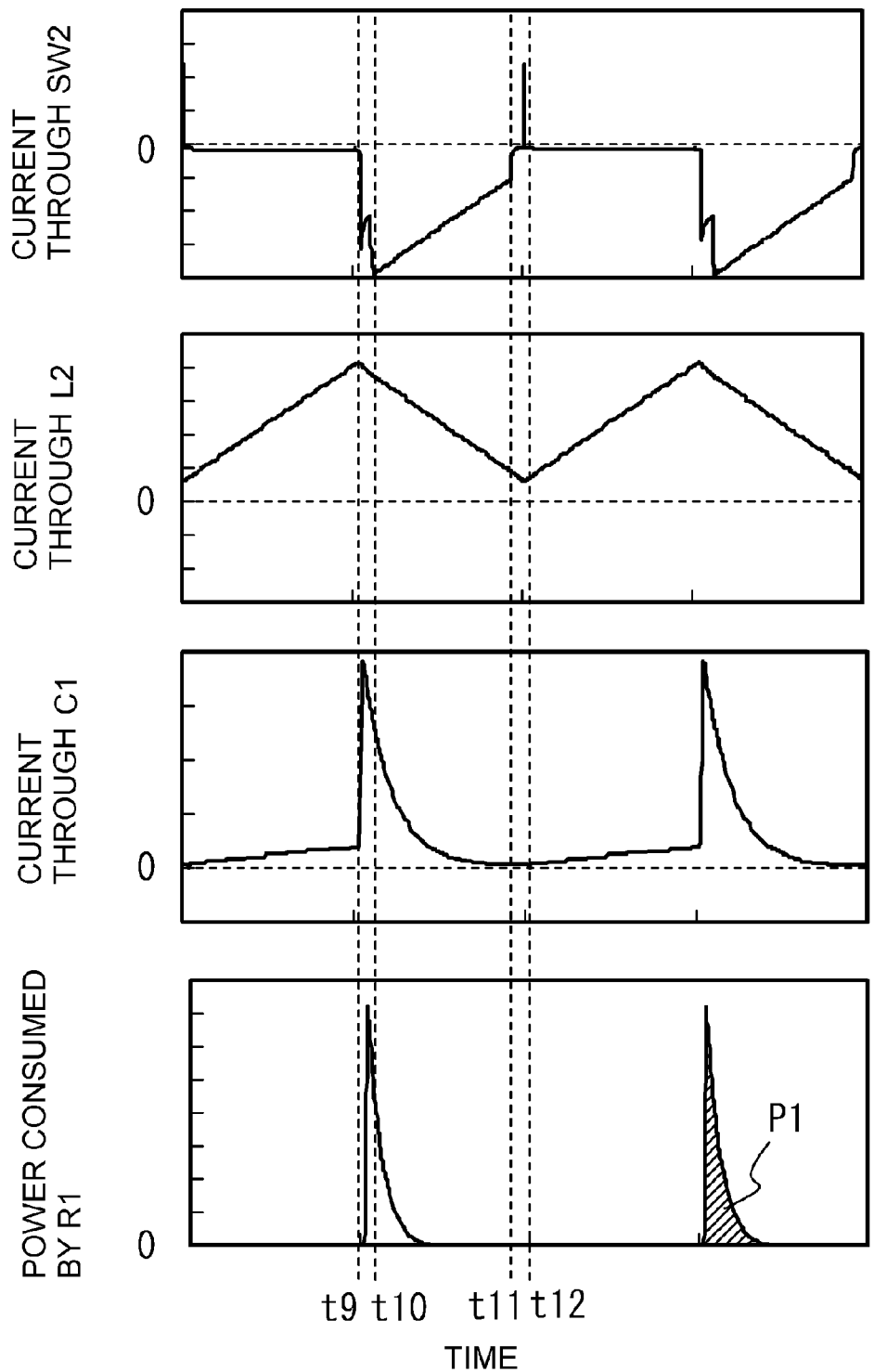
FIG. 6 is a diagram (part 2) that illustrates the simulation result of the comparative example.

FIG. 5 relates to the comparative example and illustrates the gate voltage of the first switch SW1, the gate voltage of the second switch SW2, the gate voltage of the third switch SW3, and the current that flows through the first switch SW1 with time on an arbitrary scale. Since the switches SW1 through SW3 are formed by the n-type MOSFETs, these switches are turned on when the gate voltages are high and are turned off when the gate voltages are low. FIG. 6 a diagram that relates to the comparative example and illustrates the current that flows through the second switch SW2, the current that flows through the second inductor L2, the current that flows through the first capacitor C1, and power consumed by the resistor R1. The current that flows through the first switch SW1 from the node N11 to the node N12 is defined as a positive current, and the current that flows through the second switch SW2 from the node N12 to the node N13 is defined as a positive current. The inductor current that flows through the inductor L2 from the node N12 to the node N31 is defined as a positive current, and the current that flows through the first capacitor C1 from the node N11 to the node N13 is defined as a positive current.

Referring to FIGS. 5 and 6, the second switch SW2 is in the on position during a period from time t10 to time t11 within a period from time t9 to time t12 in which the first switch SW1 is in the off position. Thus, current flows through the second switch SW2 and the first capacitor C1 is charged. The stored charge flows through the resistor R1 and is thus discharged.

Figure 7:
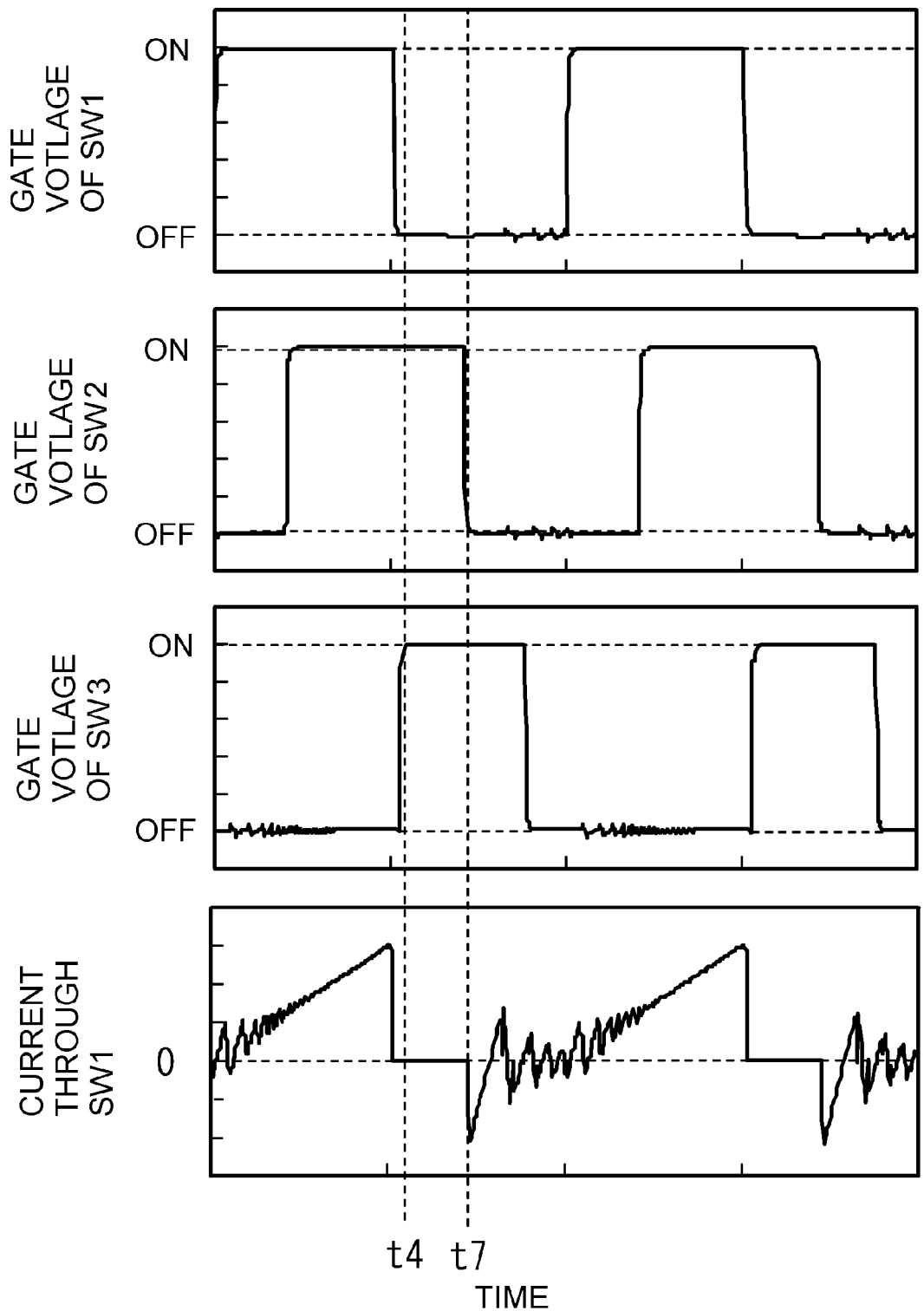
FIG. 7 is a diagram (part 1) that illustrates a simulation result of the embodiment 1.
Figure 8:
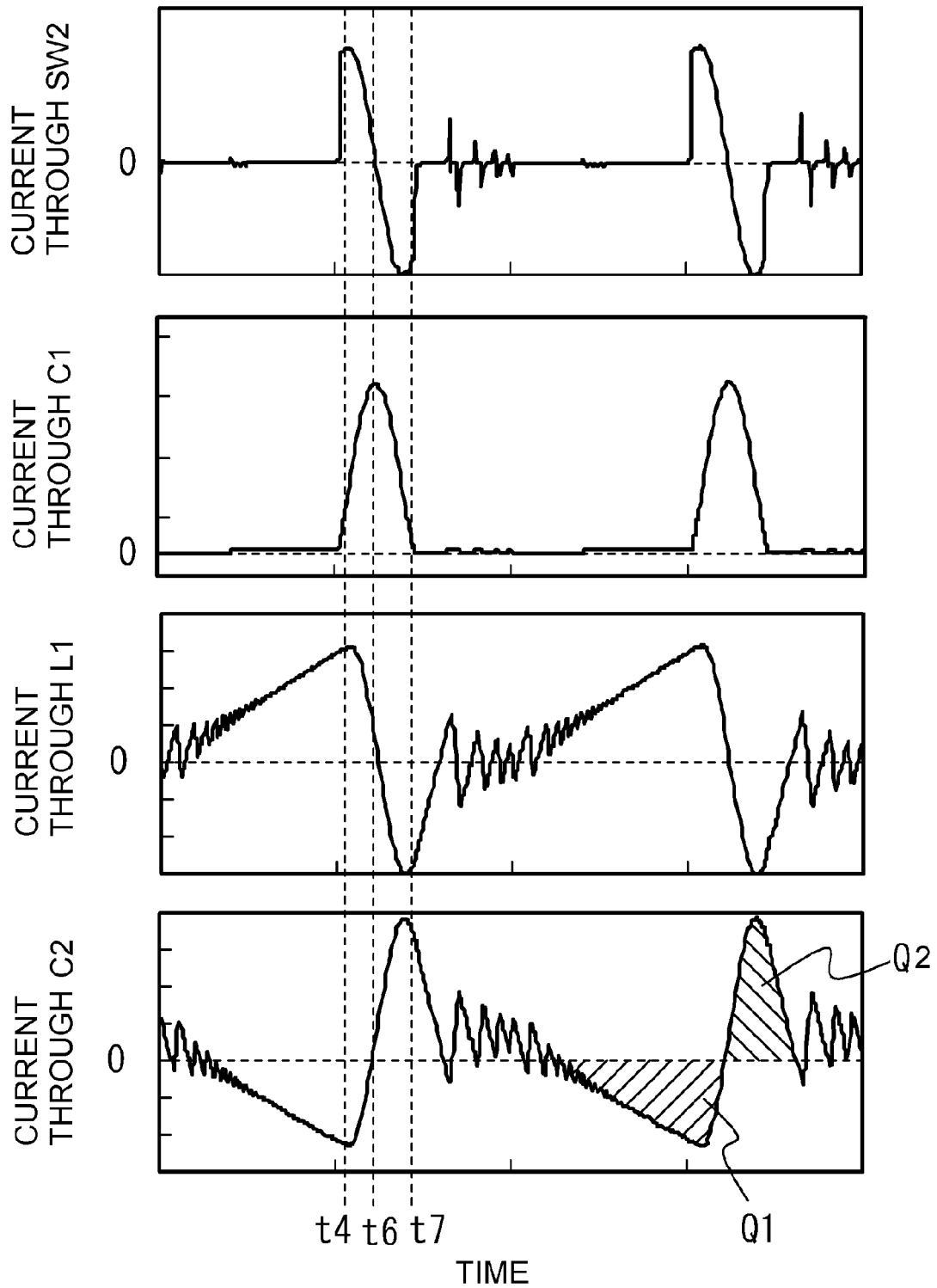
FIG. 8 is a diagram (part 2) that illustrates the simulation result of the embodiment 1.

FIG. 7 is a diagram that relates to the embodiment 1 and illustrates the gate voltage of the first switch SW1, the gate voltage of the second switch SW2, the gate voltage of the third switch SW3, and current that flows through the first switch SW1 with time on an arbitrary scale. FIG. 8 relates to the embodiment 1 and illustrates the current that flows through the second switch SW2, the current that flows through the first capacitor C1, the current that flows through the first inductor L1, and the current that flows through the second capacitor C2. The current that flows through the first switch SW1 from the node N11 to the node N12 is defined as a positive current, and the current that flows through the second switch SW2 from the node N13 to the node N12 is defined as a positive current. The current that flows through the first capacitor C1 from the node N11 to the node N13 is defined as a positive current, and the current that flows through the first inductor L1 from the node N21 to the node N11 is defined as a positive current. The current that flows through the first capacitor C2 from the node N21 to the node N22 is defined as a positive current.

Referring to FIGS. 7 and 8, during a period from time t6 to time t7, a negative current flows through the first inductor L1, and a negative current flows through the second switch SW2. These currents charge the second capacitor C2. A charge within a range Q1 is discharged from the first capacitor C2, and a charge in a range Q2 is stored in the second capacitor C2. In the above manner, the charge stored in the first capacitor C1 is stored in the second capacitor C2, and is released when the third capacitor C3 is charged. As described above, due to the transient current developed when the first switch SW1 is turned off, the charge stored in the first capacitor C1 may be regenerated. It is thus possible to improve the efficiency of the switching power supply.

According to the embodiment 1, the control circuit 40 turns off the second switch SW2 at time t7 when the voltage across the first capacitor C1 becomes zero. Thus, due to the resonance of the first inductor L1 and the first capacitor C1, the charge stored in the first capacitor C1 is released to the DC power supply 20 side. It is thus possible to regenerate power and suppress power loss. In order to move all the charge stored in the first capacitor C1 to the second capacitor C2 by discharge, it is preferable that the second switch SW2 is turned off at time t7, as in the case of the embodiment 1. In another way, the control circuit 40 may turn off the second switch SW2 at a time when the voltage across the first capacitor C1 becomes zero after the first switch SW1 is turned off or prior to the above time (that is, between time t4 and t7). The charge stored in the first capacitor C1 may be released by turning off the second switch SW2 between time t6 and time t7.

Preferably, the second capacitor C2 is connected between the positive terminal N21 of the first inductor L1 located on the DC power supply 20 side and the negative terminal N22 of the DC power supply 20. With this structure, the charge released from the first capacitor C1 may be stored in the second capacitor C2, and regeneration of power may be achieved.

Further, the control circuit 40 turns on the third switch SW3 after turning off the first switch SW1. Thus, the charge released from the first capacitor C1 may be stored in the second capacitor C2 by the current that flows via the third switch SW3 in FIG. 3. The third switch SW3 is preferably turned on after the first switch SW1 is turned off.

As illustrated in FIG. 2, the diode D1 is connected in parallel with the second switch so that the cathode is located on the DC power supply 20 side and the anode is located on the load 30 side. Thus, even when the second switch SW2 is turned off prior to time t7, current is allowed to flow from the node N12 to the node N11 via the diode D1.

As illustrated in FIG. 2, the switching power supply 10 is formed on a single substrate 60. The switching power supply 10 may be a module substrate in which the switching power supply 10 is formed on the single substrate 60.

Figure 9:
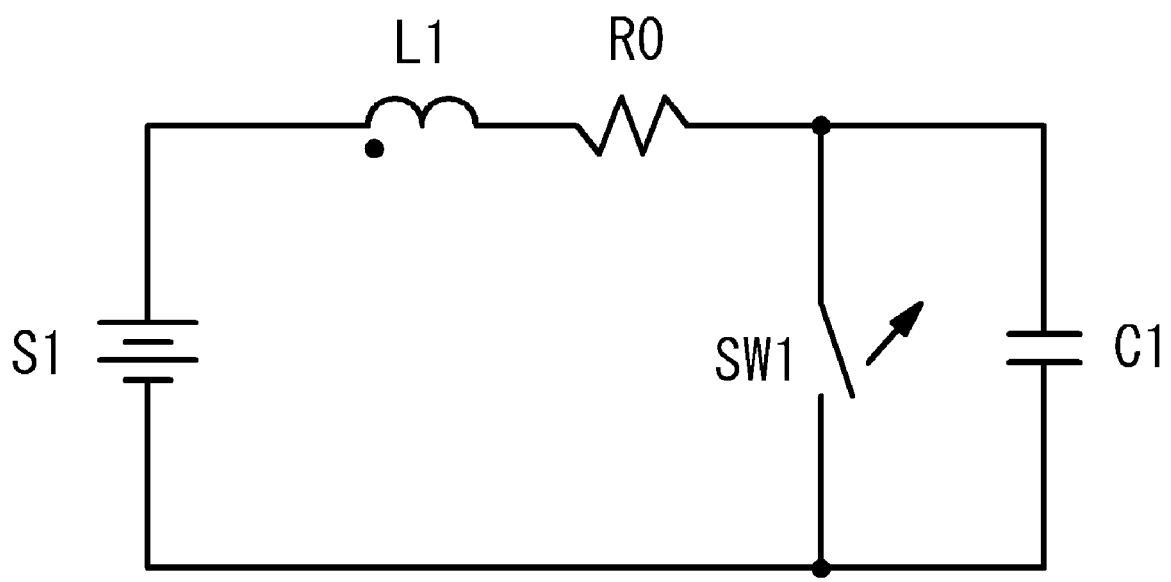
FIG. 9 is a circuit diagram of an equivalent circuit.

A description will now be given of a preferable range of the inductance value L of the first inductor L1. FIG. 9 is an equivalent circuit of the circuit of FIG. 2 during the period from time t5 to time 7 in FIG. 3 during which the second switch SW2 and the third switch SW3 are in the on position. A resistance R0 is the sum of the internal resistance R2 of the DC power supply 20, the on-state resistance of the second switch SW2 and the on-state resistance of the third switch SW3. Assuming that the inductance value of the first inductor L1 is L, the capacitance value of the first capacitor C1 is C, the resistance value of the resistor R0 is R, the current that flows in the equivalent circuit of FIG. 9 is I, and time is t, a circuit equation of the equivalent circuit of FIG. 9 is described as equation 1:

$$L\frac{dI}{dt} + \frac{1}{C}\int_0^t I\,dt + RI = E \qquad \text{(Equation 1)}$$

From equation 1, the condition for enabling the transient phenomenon of the first capacitor C1 and the first inductor L1 to vibrate is described by equation 2 in which the capacitance value of the first capacitor C1 is assumed as C and the inductance value of the first inductor L1 is assumed as L:

$$L > R^2 C/4 \qquad \text{(Equation 2)}$$

When time t4 at which the first switch SW1 is turned off is assumed as t=0, and current obtained at t=0 is I0, the voltage Vc across the first capacitor C1 is described by equation 3:

$$Vc = E + e^{-\alpha t}\{I_0\sqrt{(L/C)}\sin(At) - E\cos(At)\} \qquad \text{(Equation 3)}$$

where $$A = 1/\sqrt{(L/C)}, \alpha = R/(2L) \qquad \text{(Equation 4)}$$

Figure 10:
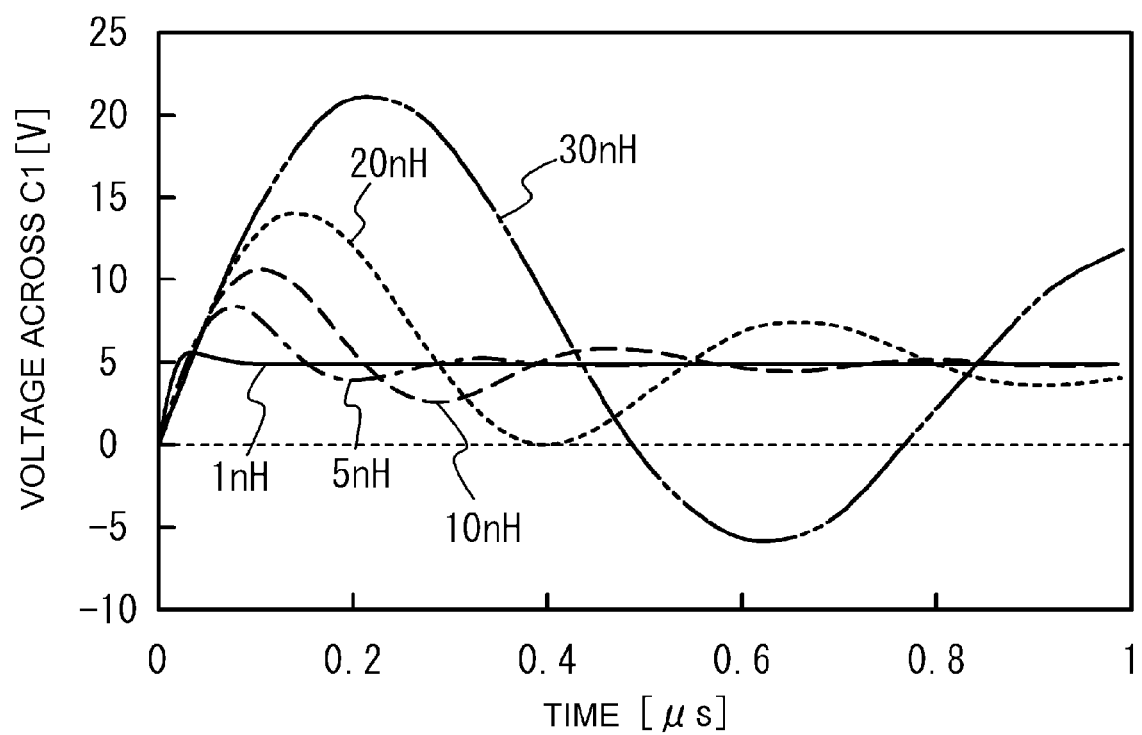
FIG. 10 is a diagram that illustrates a simulation result of the equivalent circuit.

FIG. 10 is a diagram that illustrates the time dependence of the voltage Vc across the first capacitor C1 while the inductance value L of the first inductor L1 is changed using equation 3. As the inductance value L becomes greater, the voltage varies more greatly. For L of 30 nH, the voltage across the capacitor C1 is negative. When the voltage Vc becomes zero, the second switch SW2 is turned off. Since the voltage across the first capacitor C1 becomes negative, the current 82 depicted in FIG. 3 flows, and the charge released from the first capacitor C1 is stored in the second capacitor C2. As indicated in FIG. 9 and equation 3, the load resistor R3 does not relate to the transient phenomenon. Thus, by determining the timing for turning off the second switch SW2, the charge released from the first capacitor C1 may be stored in the second capacitor C2 independently of the load connected to the switching power supply.

Embodiment 2

Figure 11:
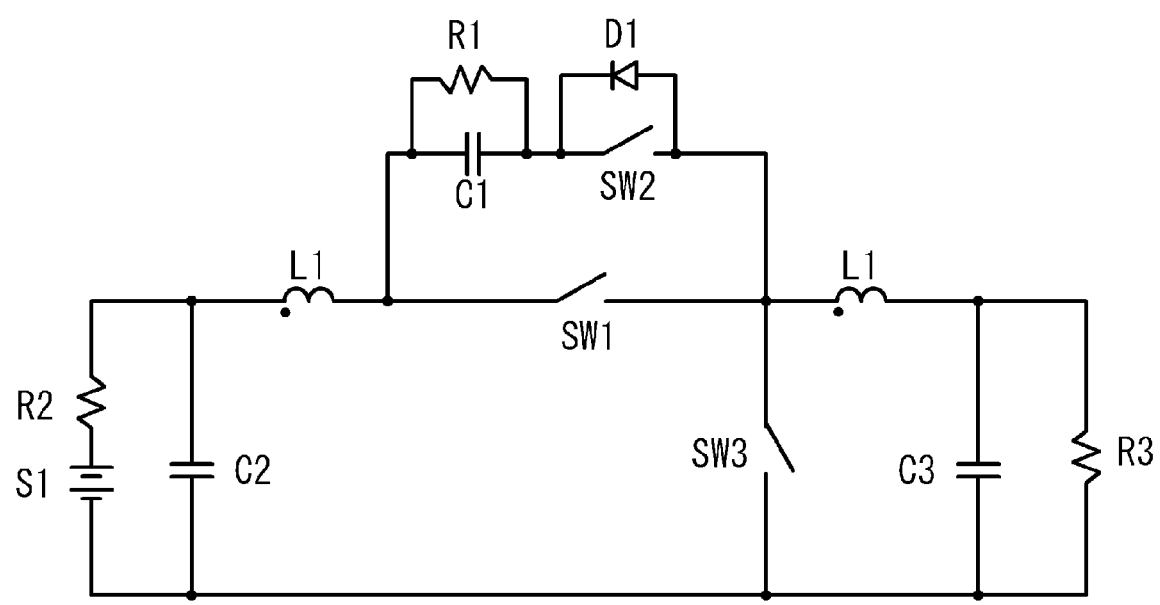
FIG. 11 is a circuit diagram of a switching power supply in accordance with an embodiment 2.

An embodiment 2 is an example in which the resistor R1 is connected in parallel with the first capacitor C1. Referring to FIG. 11, a switching power supply in accordance with the embodiment 2 is configured so that the resistor R1 is connected in parallel with the first capacitor C1. The other structures of the embodiment 2 are the same as those of the embodiment 1 illustrated in FIG. 2. In FIG. 11, the illustration of the control circuit 40 is omitted. According to the embodiment 2, the charge that is part of the charge released from the first capacitor C1 and is not stored in the second capacitor C2 is consumed by the resistor RE and the first switch SW1 is prevented from producing heat.

Embodiment 3

Figure 12:
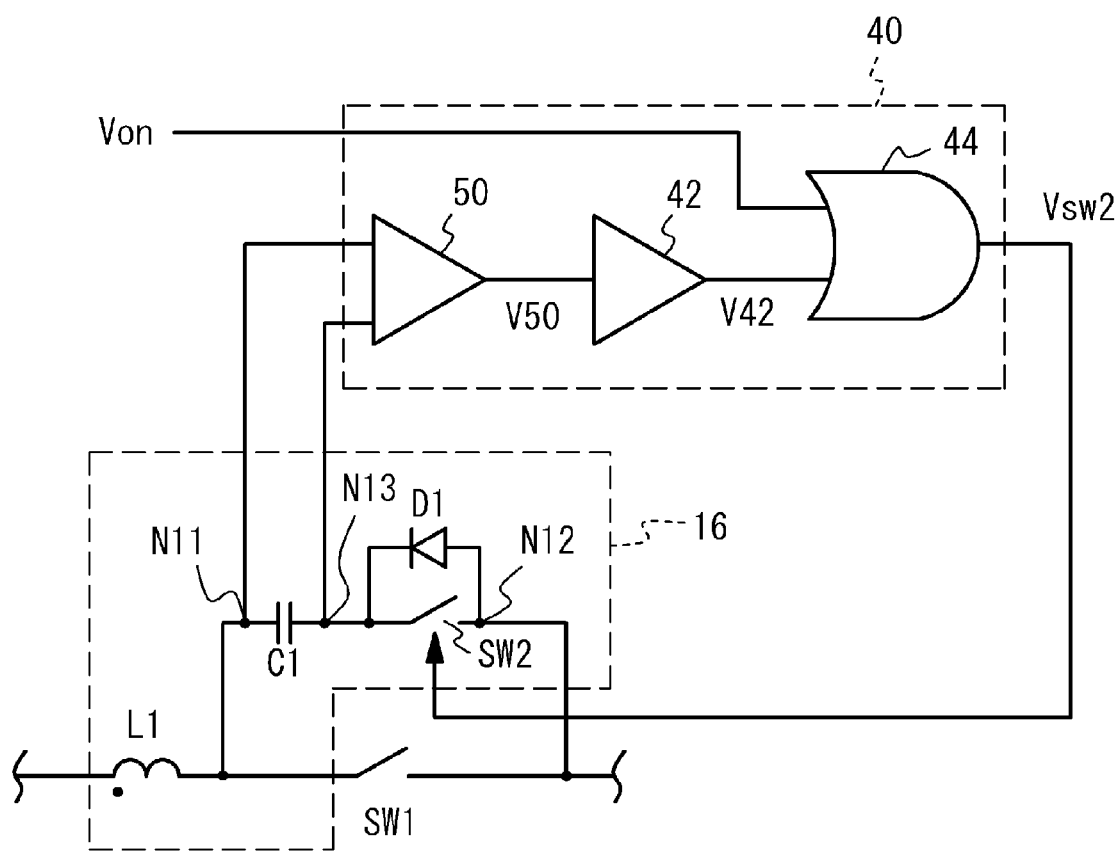
FIG. 12 is a circuit diagram of a part of a switching power supply in accordance with an embodiment 3.

An embodiment 3 is an example of the control circuit 40 of the switching power supply configured in accordance with the embodiment 1, and controls the second switch SW2 by a potential difference developed across the first capacitor C1. FIG. 12 is a circuit diagram of the transient current suppressing part 16 and a part of the control circuit 40 employed in the embodiment 3. Referring to FIG. 12, the control circuit 40 has a voltage sensing circuit 50, a buffer circuit 42, and an OR circuit 44. The voltage sensing circuit 50 outputs a low level in a case where the voltage difference between the nodes N11 and N13 is equal to or smaller than a predetermined value, and outputs a high level in a case where the voltage is greater than the predetermined value. For the predetermined value that is set small, the voltage sensing circuit 50 outputs the low level as a signal V50 when the voltage difference between the nodes N11 and N13 is almost zero. The buffer circuit 42 shapes the signal V50 in a predetermined level, and outputs the shaped signal to the OR circuit 44 as a signal V42. The OR circuit 44 outputs the high level to the second switch SW2 as a control signal Vsw2 in a case where at least one of a signal Von for turning on/off the second switch SW2 and the signal V42 is at the high level. Thus, the second switch SW2 is turned on. In contrast, in a case where the signal Von and the signal V42 are both at the low level, the OR circuit 44 outputs the low level to the second switch SW2 as the control signal Vsw2. Thus, the second switch SW2 is turned off.

Figure 13:
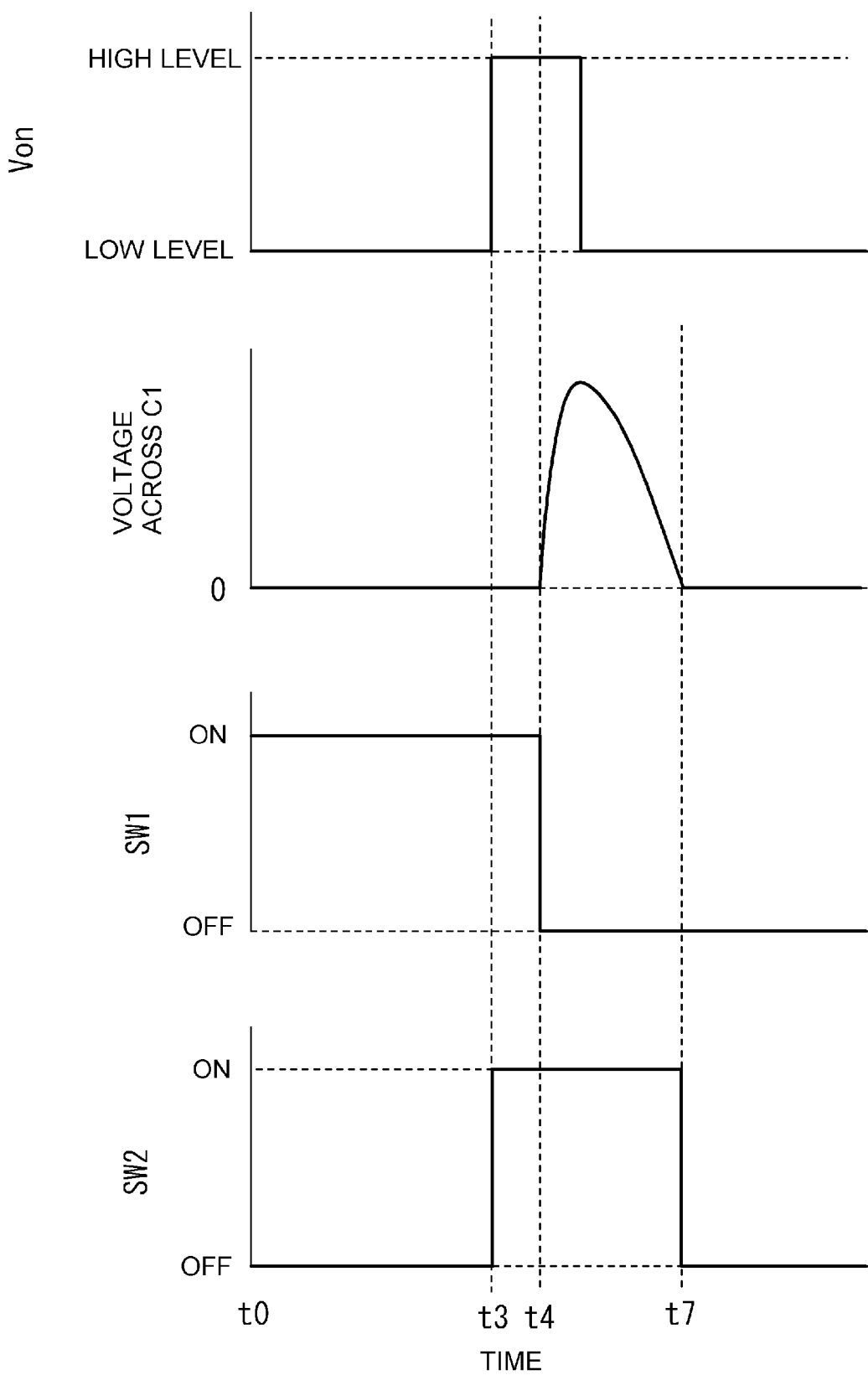
FIG. 13 is a diagram that illustrates an operation of an embodiment 3.

FIG. 13 is a diagram that illustrates the signal Von, the voltage across the first capacitor C1, on/off of the first switch SW1, and on/off of the second switch SW3 with time. Referring to FIG. 13, at time t0, the signal Von is at the low level, the voltage across the first capacitor C1 is 0 V, the first switch SW is in the on position, and the second switch SW2 is in the off position. At time t3, the second switch SW2 is turned on. When the first switch SW1 is turned off at time t4, the signals V50 and V42 are changed to the high level. The control signal Vsw2 is maintained at the high level, and the second switch SW2 is kept on. In a period between time t4 and time t7, the signal Von is changed to the low level. Since the signals V50 and V42 are at the high level, the second switch SW2 is kept on. When the voltage across the first capacitor C1 becomes zero at time t7, the signals V50 and V42 are changed to the low level, and the second switch SW2 is turned off.

In the embodiment 3, the control circuit 40 turns off the second switch SW2 in the case where the voltage difference between the both ends of the first capacitor C1 is equal to or smaller than the predetermined value and the signal Von for turning on/off the second switch SW2 is in the off position. In contrast, in at least one of the case where the potential difference between both the ends of the first capacitor C1 is greater than the predetermined value and the case where the signal Von for turning on/off the second switch SW2 is in the off position, the control circuit 40 turns on the second switch SW2. It is thus possible to turn off the second switch SW2 at time t7 when the potential difference between both the ends of the diode D1 becomes almost zero. Referring to FIG. 2, when the forward current flows through the diode D1, power consumption corresponding to the turn-on voltage is produced. According to the embodiment 3, current hardly flows through the diode D1 and power consumption may be reduced.

Embodiment 4

Figure 14:
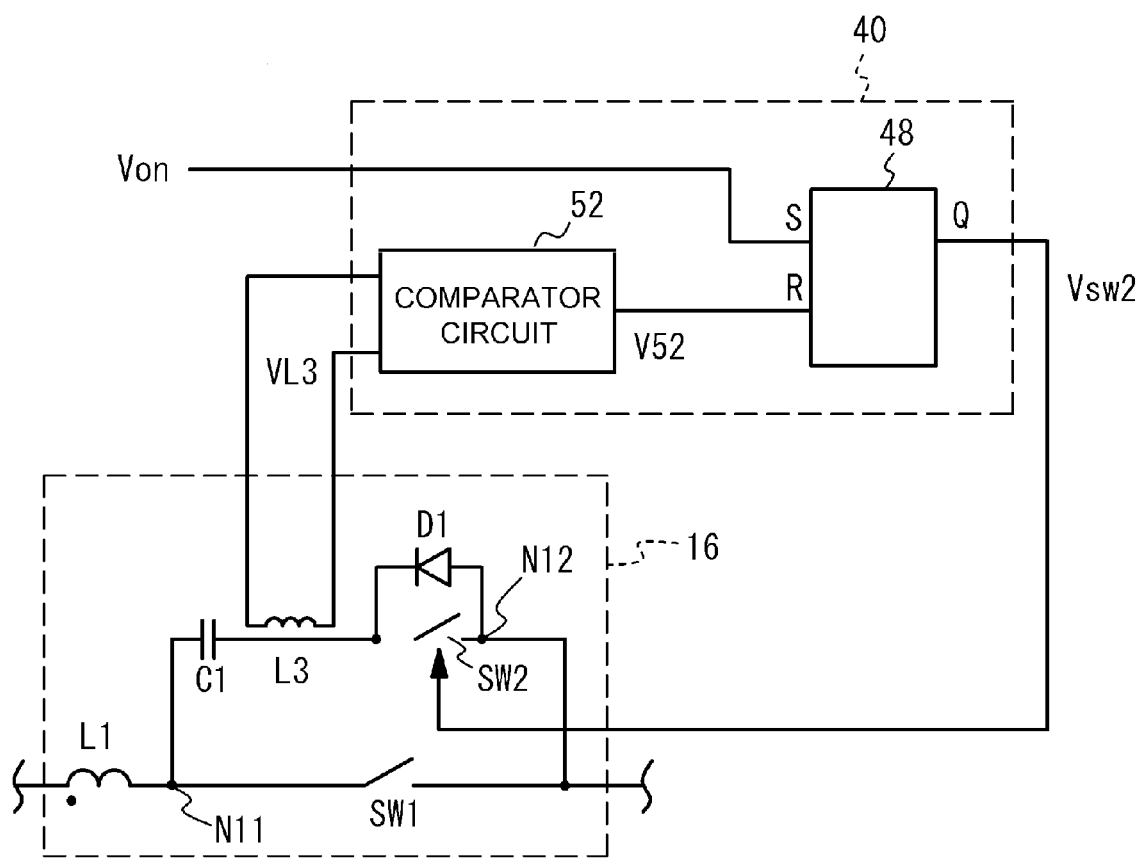
FIG. 14 is a circuit diagram of a part of a switching power supply in accordance with an embodiment 4.

An embodiment 4 is another example of the control circuit 40 of the switching power supply configured in accordance with the embodiment 1, and is configured to sense current that flows through the first capacitor C1 and control the second switch SW2. FIG. 14 is a circuit diagram that illustrates the transient current suppressing part 16 and a part of the control circuit 40 employed in the embodiment 4. Referring to FIG. 14, the control circuit 40 has a comparator circuit 52 and a flip-flop circuit 48. A current sensing coil L3 is arranged in the vicinity of a line between the node N13 of the transient current suppressing part 16 and the first capacitor C1. Current that flows through the first capacitor C1 is converted to a voltage VL3 by the coil L3. The comparator circuit 52 outputs the high level to a reset R of the flip-flop circuit 48 as a signal V52, when a voltage VL3 across the coil L3 reaches a predetermined voltage VC0. This predetermined voltage VC0 corresponds to a predetermined value IC0 close to the minimum value of the current that flows through the first capacitor C1. The signal Vo is applied to a set S of the flip-flop circuit 48 beforehand. An output Q of the flip-flop circuit 48 is output to the second switch SW2 as the control signal Vsw2. The flip-flop circuit 48 outputs the high level as the control signal Vsw2 when the signal Von reaches the high level, and output the low level as the control signal Vsw2 when the signal V52 reaches the high level.

In FIG. 14, a low resistor equal to or smaller than tens of mΩ may be connected between the node N13 and the first capacitor C1 so that a voltage across the low resistor is used to sense the current that flows through the first capacitor C1. As described above, power consumption may be suppressed by using the coil L3 or the low resistor in order to sense the current that flows through the first capacitor C1.

Figure 15:
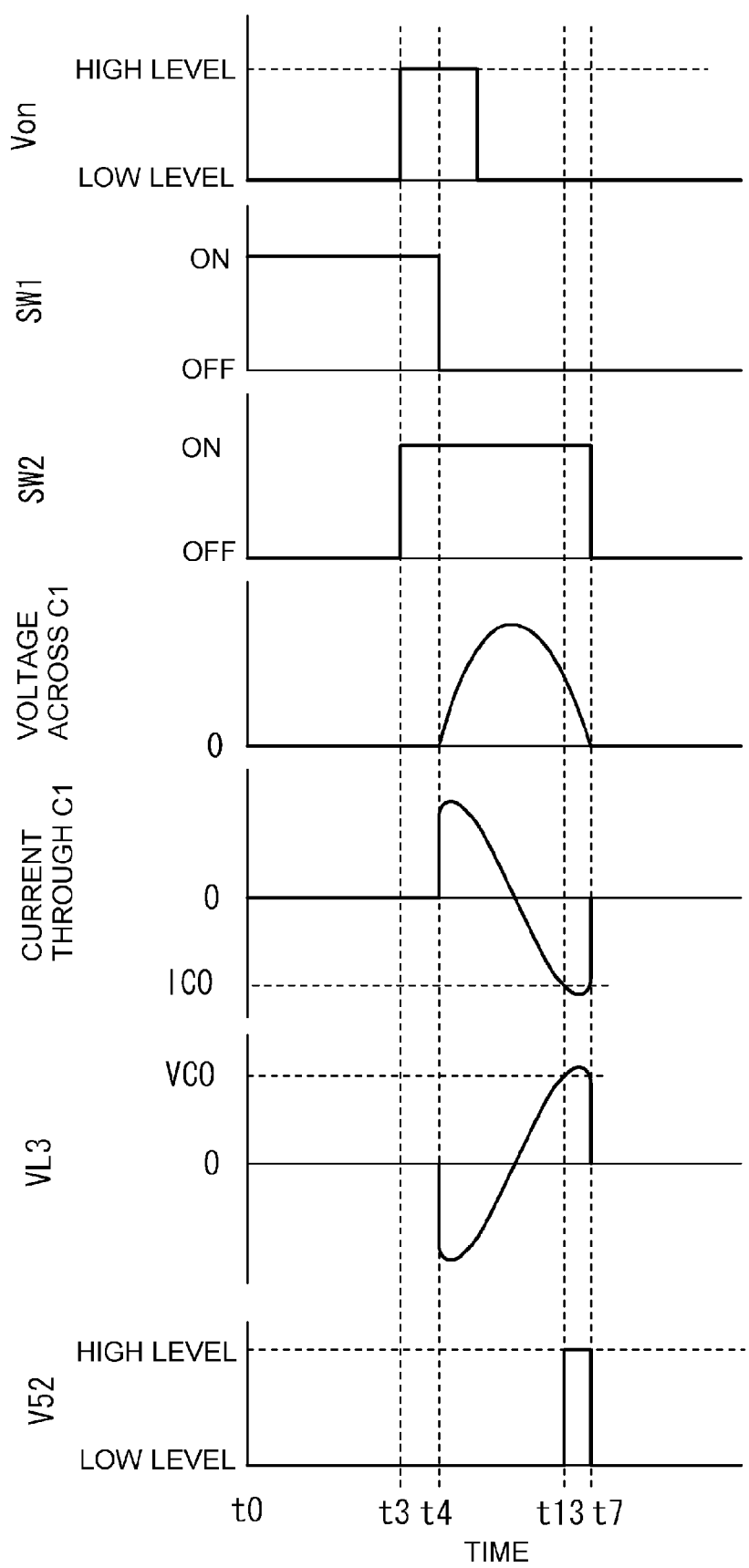
FIG. 15 is a diagram that illustrates an operation of an embodiment 4.

FIG. 15 is a diagram that illustrates the signal Von, on/off of the first switch SW1, on/off of the second switch SW2, the voltage across the first capacitor C1, the current that flows through the first capacitor C1 (in which current flowing from the node N13 to N11 is assumed as positive), the voltage VL3 across the coil L3, and the output signal V52 of the comparator circuit 52 with time. Referring to FIG. 15, at time t0, the signal Von is at the low level, the first switch SW1 is in the on position, the second switch SW2 is in the off position, the voltage across the first capacitor C1 is 0 V, the current that flows through the first capacitor C1 is 0, and the output of the comparator circuit 52 is at the low level. At time t3, the signal Von changes to the high level, and the high level is set in the flip-flop circuit 48, and the second switch SW2 is turned on. At time t4, the first switch SW1 is turned off, while the flip-flop circuit 48 holds the high level, and the second switch SW2 is kept on. During the period from time t4 to time t7, the positive current that flows through the first capacitor C1 decreases and changes to the negative current, and correspondingly, the voltage across the coil L3 in the negative region increases and then enters in the positive region. At time t13 just before the current that flows through the first capacitor C1 becomes the smallest, this current reaches the predetermined value IC0. The voltage across the coil L3 corresponding to the predetermined value IC0 is the predetermined voltage VC0.

During the period from time t4 to time t7, the signal Von is at the low level, while the flip-flop circuit 48 holds the high-level, and the second switch SW2 is continuously kept on. At time t13, the current that flows through the first capacitor C1 becomes equal to or smaller than the predetermined value IC0 (in the absolute value, greater than the predetermined value), and the voltage VL3 across the coil L3 becomes equal to or higher than the predetermined voltage VC0. Thus, the output signal V52 of the comparator circuit 52 is changed to the high level. Thus, the flip-flop circuit 48 is reset, and the control signal Vsw2 switches to the low level, so that the second switch SW2 is turned off. At time t7, the current that flows through the first capacitor C1 becomes equal to or greater than the predetermined value IC0, and the voltage VL3 across the coil L3 becomes equal to or lower than the predetermined voltage VC0. Thus, the output signal V52 of the comparator circuit 52 changes to the low level.

In the embodiment 4, the control circuit 40 turns on the second switch SW2 when the signal Von for turning on/off the second switch SW2 changes to on from off. Further, the control circuit 40 turns off the second switch SW2 when the absolute value of the current that flows through the first capacitor C1 becomes equal to or greater than the predetermined value. It is thus possible to turn off the second switch SW2 at time t7 when the current that flows through the first capacitor C1 becomes almost the largest. Thus, like the embodiment 3, consumed power may be reduced.

Embodiment 5

Figure 16:
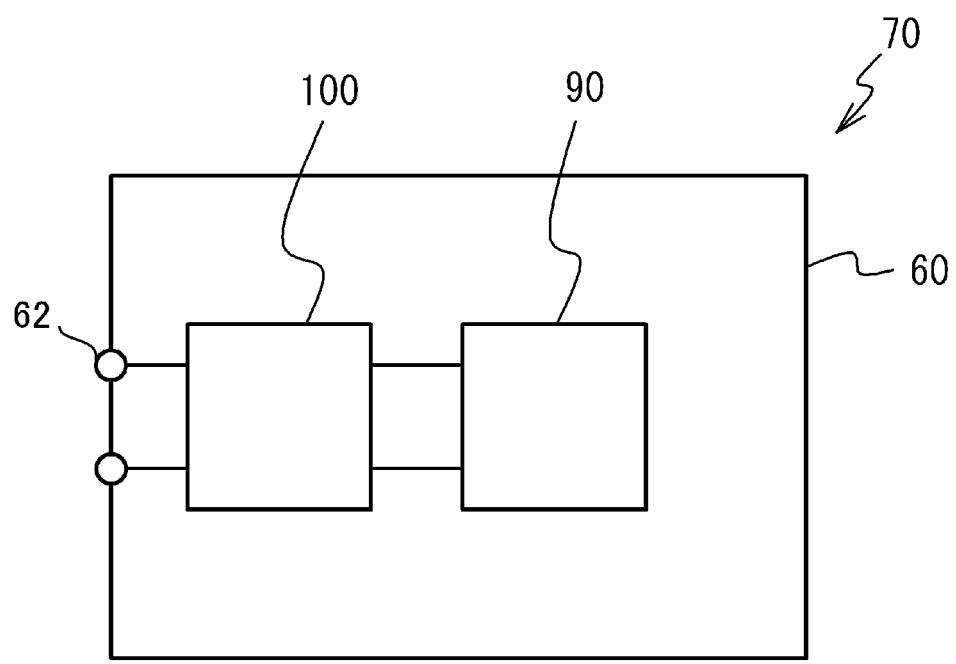
FIG. 16 is a schematic view of a module substrate in accordance with an embodiment 5.

An embodiment 5 is an exemplary module substrate on which the switching power supply is formed together with an electronic component. Referring to FIG. 16, a mother board 70 has a module 100 in which the switching power supply of any of the embodiment 1 through the embodiment 4 is incorporated, an electronic component 90 such as a CPU, and a substrate such as a PCB substrate. The switching power supply module 100 and the electronic component 90 are mounted on the same substrate 60. The switching power supply module 100 steps down the DC voltage supplied to the terminal 62, and supplies the stepped-down voltage to the electronic component 90. It is thus possible to reduce power consumed in the mother board 70.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A switching power supply comprising:
a first switch provided between a positive terminal of a DC power supply and a positive terminal of a load;
a first capacitor provided between a second switch and a node of the first switch on a DC power supply side;
the second switch connected in series with the first switch, the first switch connected in parallel with the first capacitor and a second switch;
a first inductor provided between the first capacitor and the positive terminal of the DC power supply;
a diode connected in parallel with the second switch so that a cathode of the diode is located on the DC power supply side and is connected to a node between the second switch and the first capacitor, and an anode thereof is located on a load side;
a second capacitor being provided between a node of the first inductor on the DC power supply side and a negative terminal of the DC power supply and storing a charge stored in the first capacitor; and
a control circuit that turns off the second switch after the first switch is turned off and when or before a voltage across the first capacitor becomes zero.

2. The switching power supply according to claim 1, further comprising a third switch provided between a node of the first switch on a load side and the negative terminal of the DC power supply, wherein the control circuit turns on the third switch after turning off the first switch.

3. The switching power supply according to claim 1, wherein a following stands:

$$L > R^2 C/4$$

where L is an inductance value of the first inductor, R is an on-state resistance of the second switch, and C is a capacitance value of the first capacitor.

4. The switching power supply according to claim 1, wherein the control circuit turns off when a voltage across the first capacitor becomes zero.

5. The switching power supply according to claim 1, further comprising a resistor connected in parallel with the first capacitor.

6. A switching power supply comprising:
a first switch provided between a positive terminal of a DC power supply and a positive terminal of a load;
a first capacitor provided between a second switch and a node of the first switch on a DC power supply side;
the second switch connected in series with the first switch, the first switch connected in parallel with the first capacitor and a second switch;
a first inductor provided between the first capacitor and the positive terminal of the DC power supply; and
a control circuit that turns off the second switch after the first switch is turned off and when or before a voltage across the first capacitor becomes zero,
wherein the control circuit:
turns off the second switch in a case where a voltage difference between both ends of the first capacitor is equal to or smaller than a predetermined value and a signal for turning on/off the second switch indicates off; and
turns on the second switch in at least one of a case where the potential difference between both the ends of the first capacitor is greater than the predetermined value and a case where the signal for turning on/off the second switch indicates off.

7. A switching power supply comprising:
a first switch provided between a positive terminal of a DC power supply and a positive terminal of a load;
a first capacitor provided between a second switch and a node of the first switch on a DC power supply side;
the second switch connected in series with the first switch, the first switch connected in parallel with the first capacitor and a second switch;
a first inductor provided between the first capacitor and the positive terminal of the DC power supply; and a control circuit that turns off the second switch after the first switch is turned off and when or before a voltage across the first capacitor becomes zero, wherein the control circuit:

turns on the second switch when a signal for turning on/off the second switch is turned on from off; and turns off the second switch when an absolute value of a current that flows through the first capacitor becomes equal to or greater than a predetermined value.

8. A module substrate comprising
a single substrate; and
a switching power supply formed on the single substrate, the switching power supply including
a first switch provided between a positive terminal of a DC power supply and a positive terminal of a load;
a first capacitor provided between a second switch and a node of the first switch on a DC power supply side;
the second switch connected in series with the first switch, the first switch connected in parallel with the first capacitor and the second switch;
a first inductor provided between the first capacitor and the positive terminal of the DC power supply;
a diode connected in parallel with a second switch so that a cathode of the diode is located on the DC power supply side and is connected to a node between the second switch and the first capacitor, and an anode thereof is located on a load side;
a second capacitor being provided between a node of the first inductor on the DC power supply side and a negative terminal of the DC power supply and storing a charge stored in the first capacitor; and
a control circuit that turns off the second switch after the first switch is turned off and when or before a voltage across the first capacitor becomes zero.

9. A module substrate comprising:
a switching power supply; and
an electronic component supplied with power from the switching power supply,
the switching power supply including:
a first switch provided between a positive terminal of a DC power supply and a positive terminal of a load;
a first capacitor provided between a second switch and a node of the first switch on a DC power supply side;
the second switch connected in series with the first switch, the first switch connected in parallel with the first capacitor and the second switch;
a first inductor provided between the first capacitor and the positive terminal of the DC power supply;
a diode connected in parallel with a second switch so that a cathode of the diode is located on the DC power supply side and is connected to a node between the second switch and the first capacitor, and an anode thereof is located on a load side;
a second capacitor being provided between a node of the first inductor on the DC power supply side and a negative terminal of the DC power supply and storing a charge stored in the first capacitor; and
a control circuit that turns off the second switch after the first switch is turned off and when or before a voltage across the first capacitor becomes zero.

10. A control circuit controlling a switching power supply including a first switch provided between a positive terminal of a DC power supply and a positive terminal of a load, a first capacitor provided between a second switch and a node of the first switch on a DC power supply side, the second switch connected in series with the first switch, the first switch connected in parallel with the first capacitor and the second switch, a first inductor provided between the first capacitor and the positive terminal of the DC power supply, a diode connected in parallel with the second switch so that a cathode of the diode is located on the DC power supply side and is connected to a node between the second switch and the first capacitor, and an anode thereof is located on a load side, and a second capacitor being provided between a node of the first inductor on the DC power supply side and a negative terminal of the DC power supply and storing a charge storing in the first capacitor; and the control circuit turning off the second switch after the first switch is turned off and when or before a voltage across the first capacitor becomes zero.

11. A method for controlling a switching power supply including a first switch provided between a positive terminal of a DC power supply and a positive terminal of a load, a first capacitor provided between a second switch and a node of the first switch on a DC power supply side, the second switch connected in series with the first switch, the first switch connected in parallel with the first capacitor and the second switch, a first inductor provided between the first capacitor and the positive terminal of the DC power supply, a diode connected in parallel with the second switch so that a cathode of the diode is located on the DC power supply side and is connected to a node between the second switch and the first capacitor, and an anode thereof is located on a load side, and a second capacitor being provided between a node of the first inductor on the DC power supply side and a negative terminal of the DC power supply and storing a charge stored in the first capacitor; the method comprising a step of turning off the second switch after the first switch is turned off and when or before a voltage across the first capacitor becomes zero.

* * * * *

UNITED STATES PATENT AND TRADEMARK OFFICE
CERTIFICATE OF CORRECTION

PATENT NO.        : 8,427,793 B2
APPLICATION NO.   : 12/772527
DATED             : April 23, 2013
INVENTOR(S)       : Yu Yonezawa et al.

It is certified that error appears in the above-identified patent and that said Letters Patent is hereby corrected as shown below:

In the Specification

Column 1, Line 10, Delete "PCT PCT" and insert -- PCT --, therefor.

Signed and Sealed this
Thirtieth Day of July, 2013

Teresa Stanek Rea
*Acting Director of the United States Patent and Trademark Office*